US012487976B2

(12) United States Patent
Guttula et al.

(10) Patent No.: US 12,487,976 B2
(45) Date of Patent: Dec. 2, 2025

(54) AUTOMATICALLY IMPROVING DATA ANNOTATIONS BY PROCESSING ANNOTATION PROPERTIES AND USER FEEDBACK

(71) Applicant: International Business Machines Corporation, Armonk, NY (US)

(72) Inventors: Shanmukha Chaitanya Guttula, Bengaluru (IN); Nitin Gupta, New Delhi (IN); Pranay Kumar Lohia, Bangalore (IN); Hima Patel, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 17/494,987

(22) Filed: Oct. 6, 2021

(65) Prior Publication Data

US 2023/0106490 A1 Apr. 6, 2023

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC ............................ G06F 16/215; G06F 16/2365
See application file for complete search history.

(56) References Cited

U.S. PATENT DOCUMENTS

| 9,535,894 | B2 | 1/2017 | Carrier et al. |
| 10,339,216 | B2 | 7/2019 | Marcus |
| 10,339,217 | B2 | 7/2019 | Tremblay et al. |

(Continued)

FOREIGN PATENT DOCUMENTS

CN 110750523 A 2/2020

OTHER PUBLICATIONS

Le, Vu, et al. "Interactive program synthesis." arXiv preprint arXiv:1703.03539 (2017). (Year: 2017).*

(Continued)

*Primary Examiner* — Dennis Truong
(74) *Attorney, Agent, or Firm* — Ryan, Mason & Lewis, LLP (57) ABSTRACT

Methods, systems, and computer program products for automatically improving data annotations by processing annotation properties and user feedback are provided herein. A computer-implemented method includes obtaining data annotation pairs, each comprising an input data annotation in a first format and a corresponding output data annotation in a second format; determining, within at least a portion of the data annotation pairs, one or more non-diffs; identifying, across the at least a portion of data annotation pairs, data annotation properties associated with multiple intents by processing the non-diffs using property-related rules; modifying at least a portion of the data annotation pairs based on the identified data annotation properties; outputting the modified data annotation pairs to at least one user; and generating a final collection of data annotation pairs by processing at least a portion of the modified data annotation pairs and user feedback received in response to the outputting.

20 Claims, 7 Drawing Sheets

(56) References Cited

U.S. PATENT DOCUMENTS

2022/0222574 A1* 7/2022 Fry ................. G06F 16/258

OTHER PUBLICATIONS

M. Pham, C. A. Knoblock and J. Pujara, "Learning Data Transformations with Minimal User Effort," 2019 IEEE International Conference on Big Data (Big Data), Los Angeles, CA, USA, 2019, pp. 657-664 (Year: 2019).*

Gulwani, Sumit. "Automating string processing in spreadsheets using input-output examples." ACM Sigplan Notices 46.1 (2011): 317-330 (Year: 2011).*

Li, Yunyao, et al. "Regular expression learning for information extraction." Proceedings of the 2008 conference on empirical methods in natural language processing. 2008. (Year: 2008).*

Gulwani, Sumit. "Automating string processing in spreadsheets using input-output examples." ACM Sigplan Notices 46.1 (2011): 317-330.

Hyyrö et al., "Increased bit-parallelism for approximate and multiple string matching." Journal of Experimental Algorithmics (JEA) 10 (2005): 2-6.

Jansen et al., "Determining the user intent of web search engine queries." Proceedings of the 16th international conference on World Wide Web. 2007.—User querying on Web with multiple intents.

Misra, S., IBM AppConnect [What's New]: Customised map suggestions from AI-powered Mapping Assist based on user flow history, https://community.ibm.com/community/user/integration/blogs/saptarshi-misra1/2021/03/30/ibm-appconnect-whats-new-customizing-field-suggest, Mar. 30, 2021.

Mell et al., The NIST Definition of Cloud Computing, Special Publication 800-145, Sep. 2011.

* cited by examiner

AUTOMATICALLY IMPROVING DATA ANNOTATIONS BY PROCESSING ANNOTATION PROPERTIES AND USER FEEDBACK

BACKGROUND

The present application generally relates to information technology and, more particularly, to data processing techniques. More specifically, data transformation is an important challenge from a data quality perspective. Conventional feature extraction techniques are commonly affected by heterogeneity in data, and data transformation can help in learning automatic transformation programs, which can convert source columns into target columns and provided heterogeneous data into homogeneous user-intended formatted data, by using examples of expected output for given input samples. However, the provided input and output samples are often insufficient to learn a generalizable program which can work on other portions of data sample points, and conventional approaches typically fail to determine whether a given number of annotations are sufficient to convey an intent from provided data samples.

SUMMARY

In one embodiment of the present invention, techniques for automatically improving data annotations by processing annotation properties and user feedback are provided. An exemplary computer-implemented method can include obtaining a set of data annotation pairs, wherein each of the data annotation pairs comprises an input data annotation in a first format and a corresponding output data annotation in a second format, and determining, within at least a portion of the data annotation pairs, one or more non-diffs. The method also includes identifying, across the at least a portion of the data annotation pairs, one or more data annotation properties associated with multiple intents by processing at least a portion of the one or more non-diffs using one or more property-related rules. Additionally, the method includes modifying at least a portion of the data annotation pairs based at least in part on the one or more identified data annotation properties, outputting the modified data annotation pairs to at least one user, and generating a final collection of data annotation pairs by processing at least a portion of the modified data annotation pairs and user feedback received in response to the outputting of the modified data annotation pairs.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes determining the quality of data annotations by analyzing annotation properties and improving input annotations based at least in part on user feedback and/or context-related data. Such an embodiment includes identifying one or more properties of one or more given annotation samples which can cause multiple intents. By way merely of example, a property that can cause multiple intents could include the following. Property1: (a) "Sep. 9, 2012"→"09/2012", and (b) "Nov. 11, 1995"→"11/1995", wherein "09" and "11" can be extracted from two places, causing two intents.

Additionally, such an embodiment includes identifying whether the one or more given annotation samples capture a single intent or not, and whether the one or more given annotation samples are sufficient to learn at least one generalizable program and generate quality scores for annotations. In determining sufficient samples, one or more embodiments includes checking all properties to determine if any of the defined properties are indicating multiple intents. If the intents from all properties indicate single intent, then that means the given annotations are not confusing and of high quality, which can help in learning a generalizable program.

Also, at least one embodiment includes utilizing one or more properties of the one or more given annotation samples to generate one or more new input samples to be annotated. Additionally, such an embodiment can include capturing natural language content in the one or more properties of the given annotations sample(s), such that a user will more quickly and/or easily understand the context, and providing one or more annotation samples that satisfy the given properties. Further, one or more embodiments includes identifying whether given annotations contain one or more patterns, and recommending annotation quality control only for the pattern(s) which need(s) attention. As used herein in this context, quality control refers to finding the quality scores of annotations by evaluating the annotations with respect to various defined annotation properties to identify one or more intents. If the quality score is low, indicating that most of the properties show that multiple intents exist in the annotations, an example embodiment includes generating a suggestion to the user to provide more annotations to remove such multiple intent ambiguities.

Accordingly, and as further detailed herein, one or more embodiments include implementing a system which takes annotation samples (in the form of input-output pairs) as input and determines whether one or more of the annotations in the samples capture (a) single intent or not, (b) are sufficient to be used to learn at least one generalizable program, and (c) generate quality score for annotations, with respect to at least one data transformation task.

Figure 1:
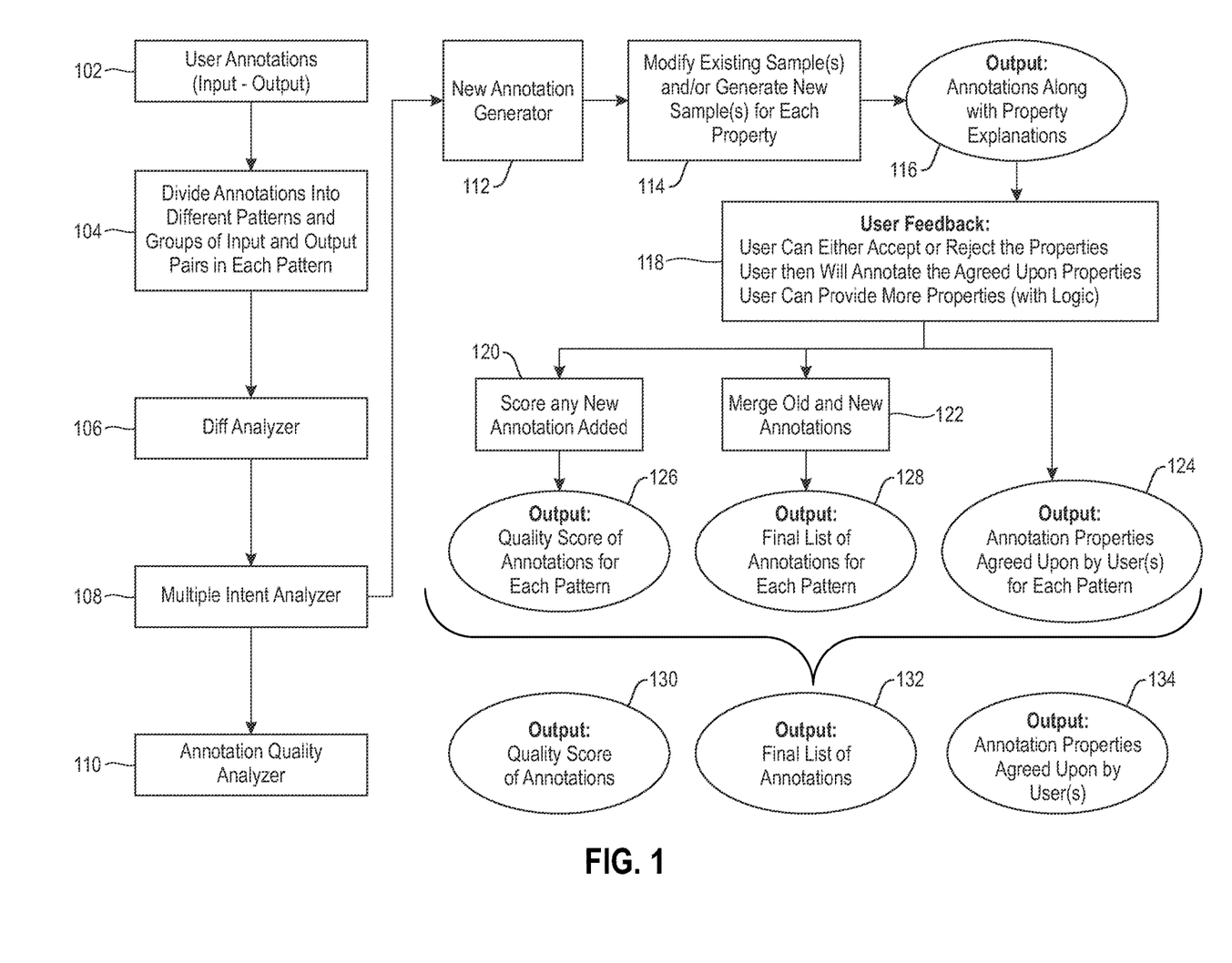
FIG. 1 is a diagram illustrating system architecture, according to an example embodiment of the invention.

FIG. 1 is a diagram illustrating system architecture, according to an embodiment of the invention. By way of illustration, FIG. 1 depicts user annotations 102 (which include one or more inputs and one or more desired outputs), which are, in step 104, divided into different patterns and divided into multiple groups of input and output pairs within each pattern. For each group and/or pattern, one or more embodiments includes repeating at least a portion of the remaining steps depicted in FIG. 1, as further described below.

Specifically, diff analyzer 106 processes inputs and corresponding outputs and identifies and/or extracts one or more constants (also referred to herein as non-diffs) from both entities. As used herein, non-diffs refer to sub-strings that are common to both input and output strings (for example, for an input of 11-21 and an output of 21, 21 is a non-diff). Diffs, on the other hand, refer to sub-strings that are not in the intersection of both input and output.

Additionally, multiple intent analyzer 108 processes at least a portion of the non-diffs extracted by diff analyzer 106 and identifies one or more confusing properties (e.g., properties that cause multiple intents and/or properties that can facilitate generalizability). In one or more embodiments, multiple intent analyzer 108 examines each property and checks if the property is satisfied using the non-diffs generated. Further, based at least in part on these identifications, annotation quality analyzer 110 generates a quality score indicating the extent of multiple intents for each group and/or pattern. In an example embodiment, annotation quality analyzer 110 can generate such a score based on the number of properties that are failing divided by the total number of properties.

As also depicted in FIG. 1, new annotation generator 112, in step 114, generates one or more new annotation samples for one or more of the properties identified by multiple intent analyzer 108 and/or modifies one or more existing annotation samples for one or more of the properties identified by multiple intent analyzer 108. By way merely of example, consider these two annotations provided by a user: "Mr. Nitin Gupta→Gupta Nitin", and "Dr. Sekhar Gupta→Gupta Sekhar". Here, "Gupta" is an exact match non-diff in both strings, and one or more embodiments includes checking if it should always be "Gupta" in the output string. Accordingly, such an embodiment can also include taking one of the two strings and replacing "Gupta" with a random string such as "Mr. Nitin Xams," and querying the user what would be output annotation for this string. This is the new annotation generation process. Further, if the user gives the output as "Xams Nitin," then such an embodiment can include adding "Mr. Nitin Xams"→"Xams Nitin" to the annotation list. This is an example process of adding a new annotation to existing annotations.

The resulting output 116, includes new and/or modified annotations with corresponding property explanations. In accordance with the above illustrative example, at least one embodiment includes validating with the user whether "Gupta" should always be present in the output. An explanation can be provided to user that "Gupta" is found repeated across multiple annotations and query whether it is desired or not. Further, in step 118, user feedback is generated in response to the output annotations 116, wherein such feedback can include a user accepting one or more of the confusing properties and annotating the corresponding samples, and/or a user providing new properties and logic based on an understanding of the existing properties. By way of clarity and completeness, as used herein, property refers to different characteristics of annotation samples, whereas annotation refers to input and output samples.

Any new annotation added is scored (e.g., by an annotation quality analyzer) in step 120, and an output 126 is generated that includes the quality score of annotations for each pattern. Additionally, step 122 includes merging old/existing annotations and new annotations into one or more collections, and step 128 includes generating an output that includes a final list of annotations for each pattern. Further, based at least in part on the user feedback generated in step 118, an output 124 is generated that includes an identification of annotation properties agreed upon by the user(s) for each pattern. Additionally, in one or more embodiments, outputs 124, 126, and 128 can be utilized to generate global outputs including output 130, which includes a quality score of all annotations, output 132, which includes a final list of all annotations, and output 134, which includes an identification of all annotation properties agreed upon by the user(s).

As detailed herein, at least one embodiment includes identifying and/or determining patterns among sets of annotations using syntactic homogeneity and/or pattern-based similarity techniques such as, for example, one or more regular expression learning-based clustering algorithms. Additionally, in one or more embodiments, determining transformation properties in given strings of annotations can include computing at least one diff and/or at least one non-diff between all pairs of input-output tuples (e.g., a tuple such as 19-11-1995-19/11/1995). As illustrated, for example, in the illustrative embodiments depicted in FIG. 2 and FIG. 3, the level of diversity among non-diffs in input strings can represent and/or indicate the specificity of the intent in question.

Such an embodiment can also include checking for the presence of one or more of the following properties among non-diffs. For example, such an embodiment can include checking for similar length non-diffs (e.g., as seen in ABCD 123 and BDGSJ_535), checking for exact position placement of non-diffs (e.g., as seen in AB 1234 AB and CD_334456_DHS), determining whether given non-diffs are similar in Token Type (e.g., as seen in A1B-123-A2BD and 1AV-53-GG34), and/or determining whether there are any repeating characters within each non-diff and whether a pattern is repeating in all strings.

Additionally, one or more embodiments include using at least one determined and/or identified property set to generate new strings for annotation. Such properties can include, for example, similar length non-diffs (e.g., wherein the generated strings have different lengths just for the given non-diffs), exact position placement of non-diffs (e.g., wherein the generated strings have positions that are at least slightly modified from original strings), similar non-diffs with respect to token type (e.g., wherein the generated strings include changes to different token types), and presence of repeating characters within each non-diff and one or more patterns repeating in all strings (e.g., wherein the generated strings do not repeat the characters in each string specifically where the patterns are repeated).

Figure 2:
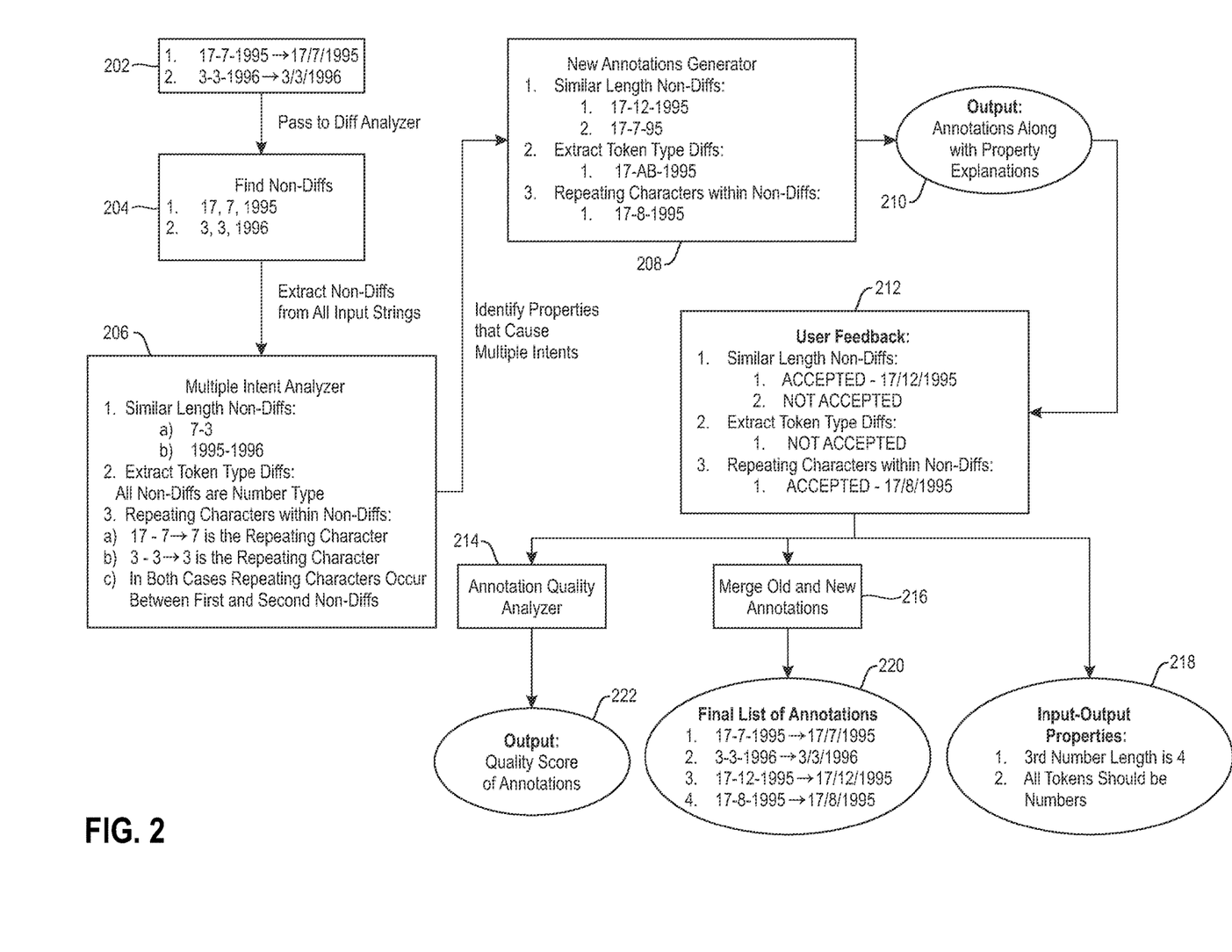
FIG. 2 is a diagram illustrating system architecture, according to an example embodiment of the invention.

FIG. 2 is a diagram illustrating system architecture, according to an example embodiment of the invention. By way of illustration, FIG. 2 depicts annotation input-output tuples 202 (namely, a first tuple including 17-7-1995→17/7/1995 and a second tuple including Mar. 3, 1996→Mar. 3, 1996), which are passed to diff analyzer 204 to find and/or determine non-diffs (namely, 17, 7, and 1995; and 3, 3, and 1996, respectively). Those non-diffs are extracted from the input strings and provided to multiple intent analyzer 206. As detailed herein, the multiple intent analyzer 206 determines whether each property is satisfied using the non-diffs generated.

Properties that cause multiple intents are identified by multiple intent analyzer 206 and provided as input to new annotations generator 208, which processes such input and determines similar length non-diffs, exact token type diffs, and repeating characters within non-diffs. As noted herein, exact token non-diffs refer to sub-strings from all input-output tuples which are of the same token type. For example, consider 19-12→19, and 01-20→01. Here, "19" and "01" are non-diffs and both are numbers (i.e., the same token type). Based at least in part on these determinations, output 210 is generated which includes one or more of the annotations along with corresponding property explanations. User feedback 212 is provided in response to output 210, wherein such feedback can include user acceptance or non-acceptance of one or more of the annotation properties. At least a portion of user feedback 212 is provided to annotation quality analyzer 214 to generate output 222, which includes a quality score attributed to at least a portion of the annotations. Also, at least a portion of user feedback 212 is used to merge old and new annotations in step 216, which is followed by the generation of a final list of annotations 220. Further, at least a portion of user feedback 212 is used to generate a listing of input-output properties 218.

Figure 3:
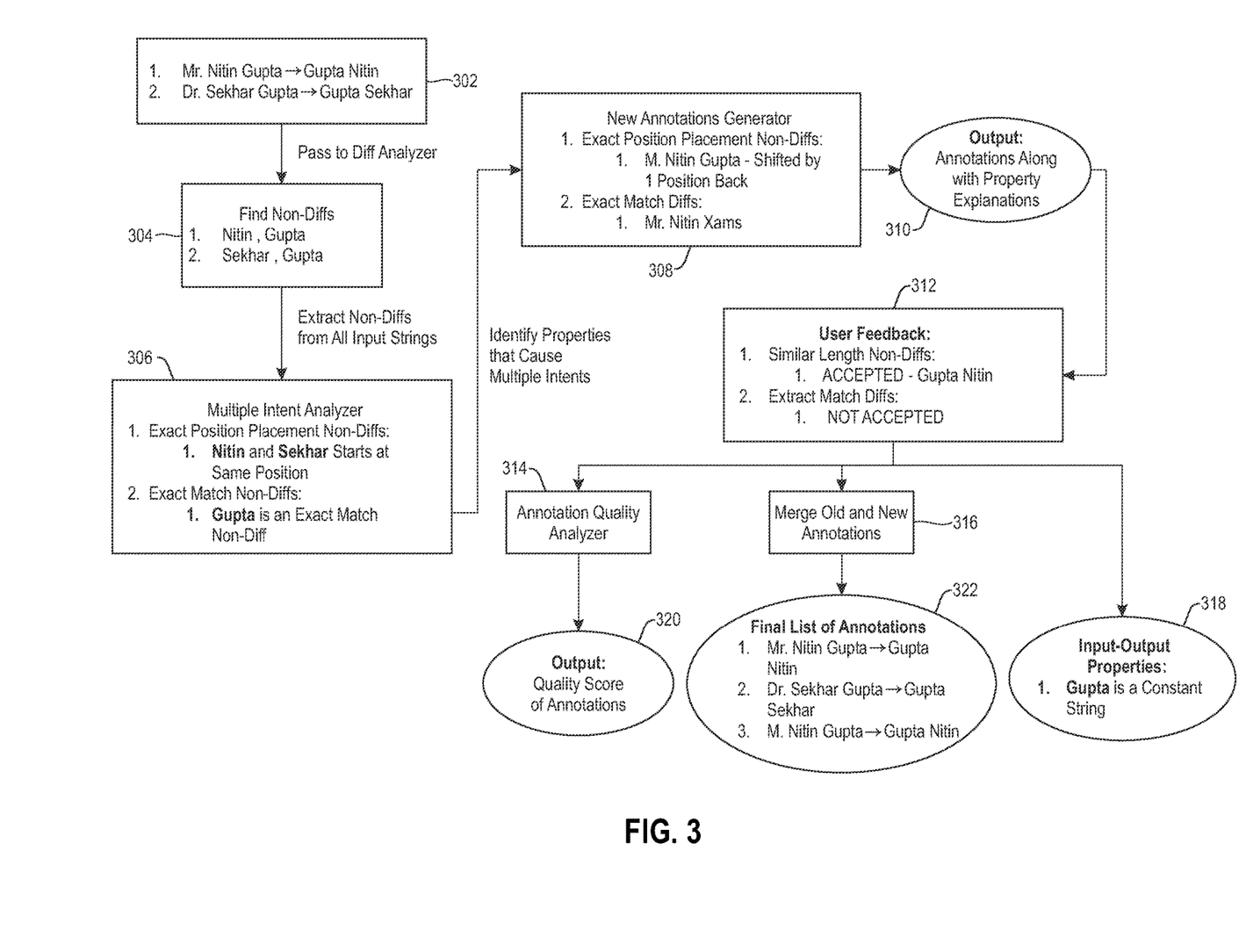
FIG. 3 is a diagram illustrating system architecture, according to an example embodiment of the invention.

FIG. 3 is a diagram illustrating system architecture, according to an example embodiment of the invention. By way of illustration, FIG. 3 depicts annotation input-output tuples 302 (namely, a first tuple including Mr. Nitin Gupta→Gupta Nitin and a second tuple including Dr. Sekhar Gupta→Gupta Sekhar), which are passed to diff analyzer 304 to find and/or determine non-diffs (namely, Nitin, and Gupta; and Sekhar, and Gupta, respectively). Those non-diffs are extracted from the input strings and provided to multiple intent analyzer 306. As detailed herein, the multiple intent analyzer 306 determines whether each property is satisfied using the non-diffs generated.

As illustrated and detailed herein, FIG. 3 and FIG. 2 depict a similar system with different annotation tuples, for purposes of illustration of one or more embodiments. Accordingly, with respect to FIG. 3, properties that cause multiple intents are identified by multiple intent analyzer 306 and provided as input to new annotations generator 308, which processes such input and determines exact position placement non-diffs, and exact match non-diffs. Based at least in part on these determinations, output 310 is generated which includes one or more of the annotations along with corresponding property explanations. User feedback 312 is provided in response to output 310, wherein such feedback can include user acceptance or non-acceptance of one or more of the annotation properties. At least a portion of user feedback 312 is provided to annotation quality analyzer 314 to generate output 320, which includes a quality score attributed to at least a portion of the annotations. Also, at least a portion of user feedback 312 is used to merge old and new annotations in step 316, which is followed by the generation of a final list of annotations 322. Further, at least a portion of user feedback 312 is used to generate a listing of input-output properties 318 (e.g., "Gupta" is a constant string).

Figure 4:
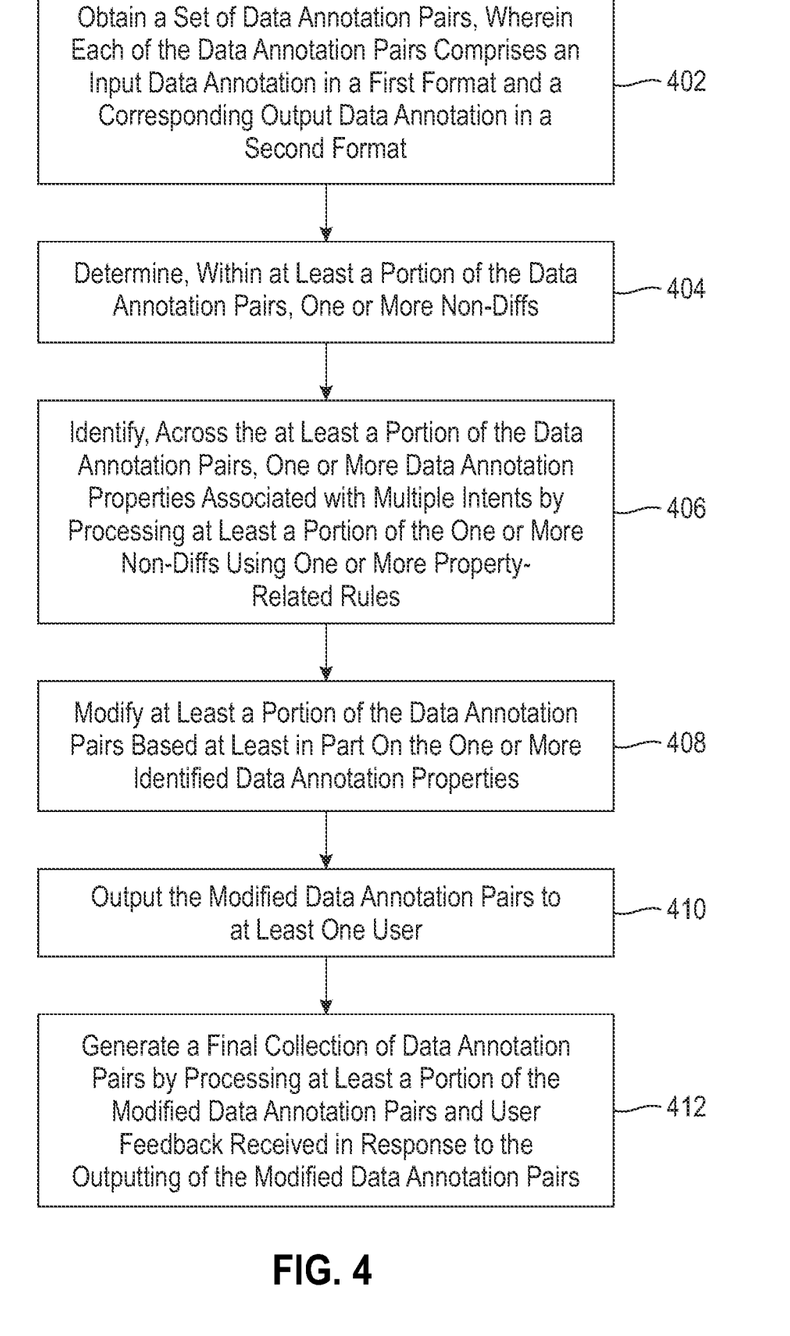
FIG. 4 is a flow diagram illustrating techniques according to an embodiment of the invention.

FIG. 4 is a flow diagram illustrating techniques according to an embodiment of the present invention. Step 402 includes obtaining a set of data annotation pairs, wherein each of the data annotation pairs comprises an input data annotation in a first format and a corresponding output data annotation in a second format.

Step 404 includes determining, within at least a portion of the data annotation pairs, one or more non-diffs. In at least one embodiment, determining the one or more non-diffs includes processing the at least a portion of the data annotation pairs for presence of similar length non-diffs in respective input data annotations and corresponding output data annotations. Additionally or alternatively, determining the one or more non-diffs can include processing the at least a portion of the data annotation pairs for presence of identical position placement of at least one non-diff in respective input data annotations and corresponding output data annotations. Also, in one or more embodiments, determining the one or more non-diffs includes processing the at least a portion of the data annotation pairs for presence of at least one non-diff of a same token type in respective input data annotations and corresponding output data annotations. Additionally or alternatively, determining the one or more non-diffs can include processing the at least a portion of the data annotation pairs for presence of one or more repeating characters within at least one non-diff in respective input data annotations and corresponding output data annotations.

Step 406 includes identifying, across the at least a portion of the data annotation pairs, one or more data annotation properties associated with multiple intents by processing at least a portion of the one or more non-diffs using one or more property-related rules.

Step 408 includes modifying at least a portion of the data annotation pairs based at least in part on the one or more identified data annotation properties. In one or more embodiments, modifying the at least a portion of the data annotation pairs includes generating one or more new data annotation pairs based at least in part on the one or more identified data annotation properties and the obtained set of data annotation pairs. Additionally or alternatively, modifying the at least a portion of the data annotation pairs can include updating one or more of the obtained set of data annotation pairs based at least in part on the one or more identified data annotation properties.

Step 410 includes outputting the modified data annotation pairs to at least one user. Step 412 includes generating a final collection of data annotation pairs by processing at least a portion of the modified data annotation pairs and user feedback received in response to the outputting of the modified data annotation pairs. In at least one embodiment, the user feedback includes acceptance of at least a portion of the one or more identified data annotation properties and/or rejection of at least a portion of the one or more identified data annotation properties.

The techniques depicted in FIG. 4 can also include computing quality scores for the obtained set of data annotation pairs, wherein the quality scores are based at least in part on extent of multiple intents associated with the obtained set of data annotation pairs. Such an embodiment can additionally include computing quality scores for the final collection of data annotation pairs, wherein the quality scores are based at least in part on extent of multiple intents associated with the final collection of data annotation pairs, and comparing the quality scores for the final collection of data annotation pairs to the quality scores for the obtained set of data annotation pairs.

Further, in one or more embodiments, software implementing the techniques depicted in FIG. 4 can be provided as a service in a cloud environment.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
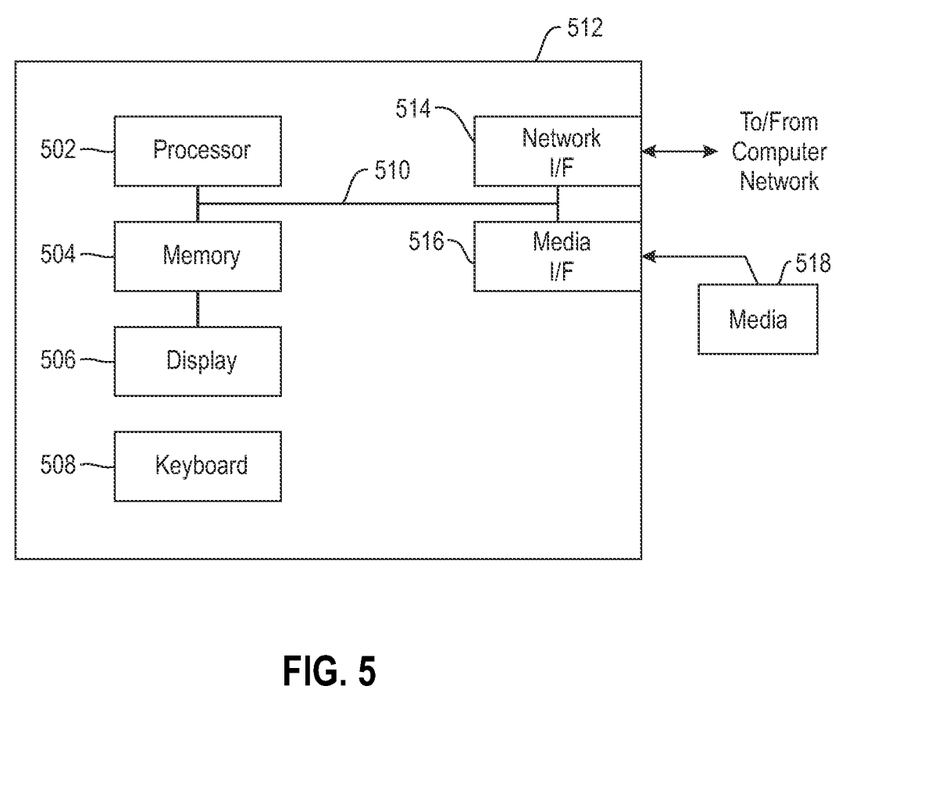
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
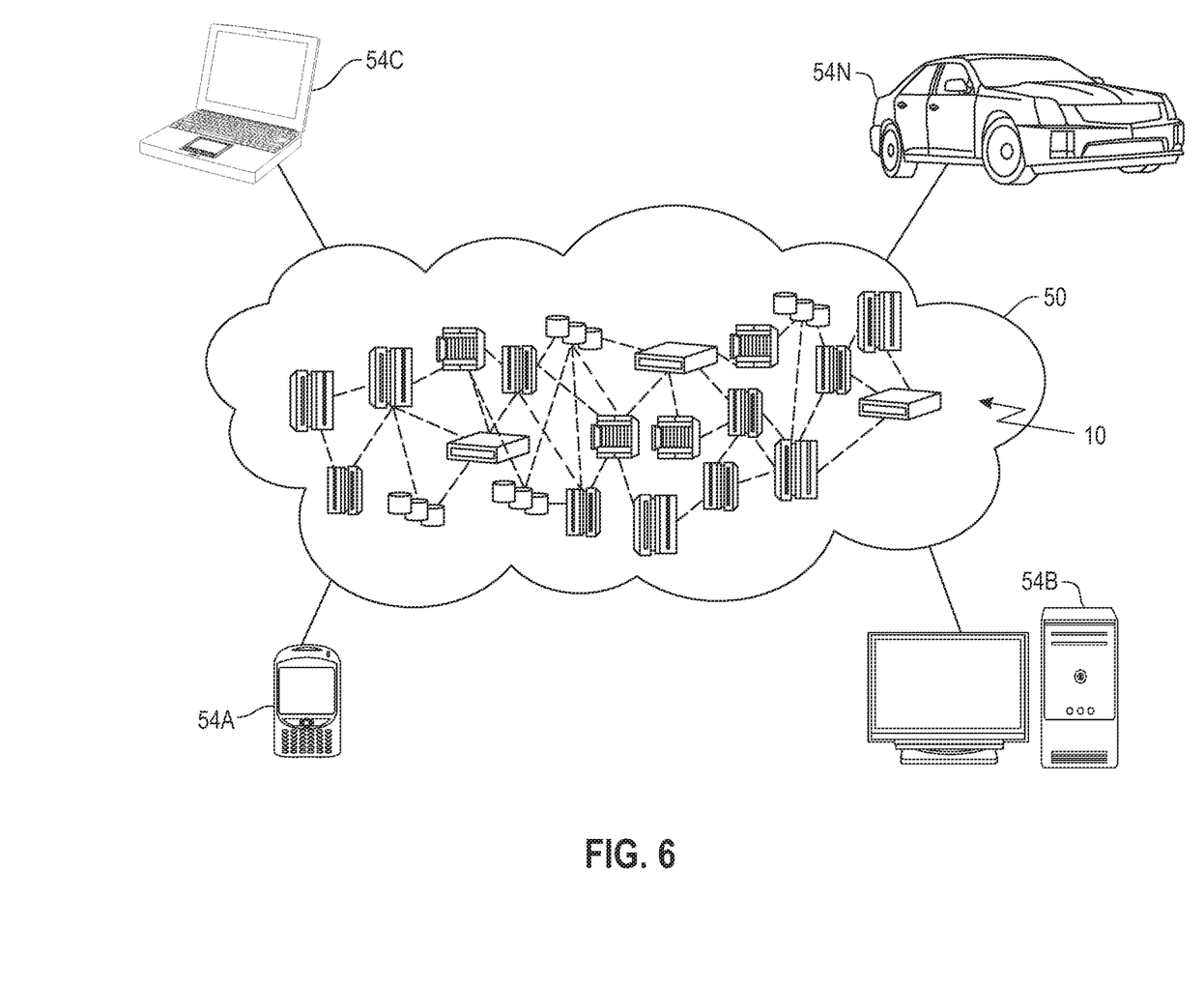
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
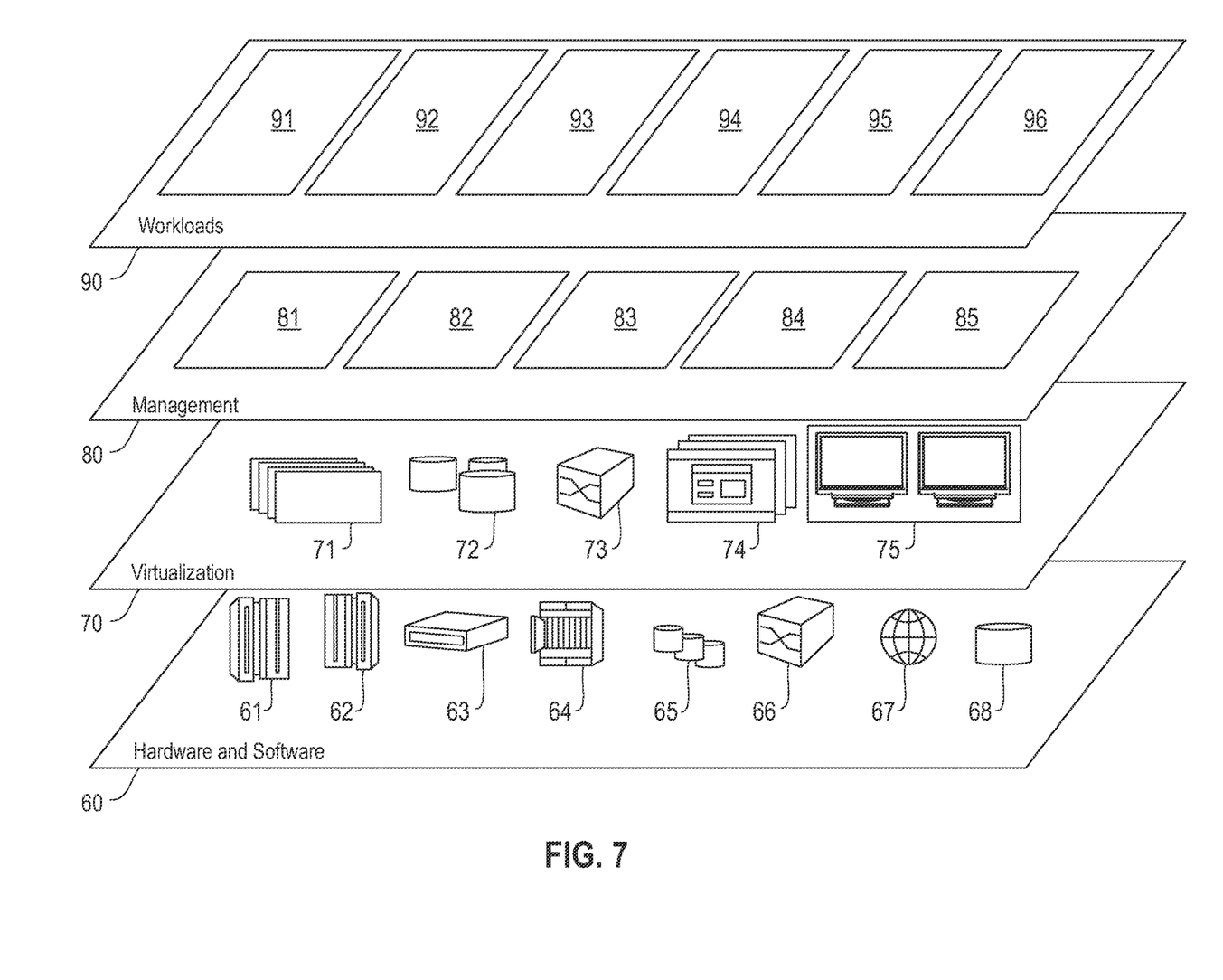
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data annotation enhancement 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically improving data annotations by processing annotation properties and user feedback.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining a set of data annotation pairs, wherein each of the data annotation pairs comprises an input data annotation in a first format and a corresponding output data annotation in a second format;
    determining, within at least a portion of the data annotation pairs, one or more non-diffs;
    determining, across the at least a portion of the data annotation pairs, one or more data annotation properties associated with multiple intents by processing at least a portion of the one or more non-diffs using one or more regular expression learning-based clustering algorithms to group instances of the one or more non-diffs within the at least a portion of the data annotation pairs on a basis of at least one of (i) one or more repeating characters within the one or more non-diffs, (ii) non-diff positioning, and (iii) one or more matching words within the one or more non-diffs;
    modifying at least a portion of the data annotation pairs based at least in part on the one or more identified data annotation properties;
    outputting the modified data annotation pairs to at least one user; and
    generating a final collection of data annotation pairs by processing at least a portion of the modified data annotation pairs and user feedback received in response to the outputting of the modified data annotation pairs;
    wherein the method is carried out by at least one computing device.

2. The computer-implemented method of claim 1, wherein determining the one or more non-diffs comprises processing the at least a portion of the data annotation pairs for presence of similar length non-diffs in respective input data annotations and corresponding output data annotations.

3. The computer-implemented method of claim 1, wherein determining the one or more non-diffs comprises processing the at least a portion of the data annotation pairs for presence of identical position placement of at least one non-diff in respective input data annotations and corresponding output data annotations.

4. The computer-implemented method of claim 1, wherein determining the one or more non-diffs comprises processing the at least a portion of the data annotation pairs for presence of at least one non-diff of a same token type in respective input data annotations and corresponding output data annotations.

5. The computer-implemented method of claim 1, wherein determining the one or more non-diffs comprises processing the at least a portion of the data annotation pairs for presence of one or more repeating characters within at least one non-diff in respective input data annotations and corresponding output data annotations.

6. The computer-implemented method of claim 1, wherein the user feedback comprises at least one of acceptance of at least a portion of the one or more identified data annotation properties and rejection of at least a portion of the one or more identified data annotation properties.

7. The computer-implemented method of claim 1, wherein modifying the at least a portion of the data annotation pairs comprises generating one or more new data annotation pairs based at least in part on the one or more identified data annotation properties and the obtained set of data annotation pairs.

8. The computer-implemented method of claim 1, wherein modifying the at least a portion of the data annotation pairs comprises updating one or more of the obtained set of data annotation pairs based at least in part on the one or more identified data annotation properties.

9. The computer-implemented method of claim 1, further comprising:
    computing quality scores for the obtained set of data annotation pairs, wherein the quality scores are based at least in part on extent of multiple intents associated with the obtained set of data annotation pairs.

10. The computer-implemented method of claim 9, further comprising:
    computing quality scores for the final collection of data annotation pairs, wherein the quality scores are based at least in part on extent of multiple intents associated with the final collection of data annotation pairs; and comparing the quality scores for the final collection of data annotation pairs to the quality scores for the obtained set of data annotation pairs.

11. The computer-implemented method of claim 1, wherein software implementing the method is provided as a service in a cloud environment.

12. A computer program product comprising a computer readable storage medium having program instructions embodied therewith, the program instructions executable by a computing device to cause the computing device to:

obtain a set of data annotation pairs, wherein each of the data annotation pairs comprises an input data annotation in a first format and a corresponding output data annotation in a second format;

determine, within at least a portion of the data annotation pairs, one or more non-diffs;

determine, across the at least a portion of the data annotation pairs, one or more data annotation properties associated with multiple intents by processing at least a portion of the one or more non-diffs using one or more regular expression learning-based clustering algorithms to group instances of the one or more non-diffs within the at least a portion of the data annotation pairs on a basis of at least one of (i) one or more repeating characters within the one or more non-diffs, (ii) non-diff positioning, and (iii) one or more matching words within the one or more non-diffs;

modify at least a portion of the data annotation pairs based at least in part on the one or more identified data annotation properties;

output the modified data annotation pairs to at least one user; and generate a final collection of data annotation pairs by processing at least a portion of the modified data annotation pairs and user feedback received in response to the outputting of the modified data annotation pairs.

13. The computer program product of claim 12, wherein determining the one or more non-diffs comprises processing the at least a portion of the data annotation pairs for presence of similar length non-diffs in respective input data annotations and corresponding output data annotations.

14. The computer program product of claim 12, wherein determining the one or more non-diffs comprises processing the at least a portion of the data annotation pairs for presence of identical position placement of at least one non-diff in respective input data annotations and corresponding output data annotations.

15. The computer program product of claim 12, wherein determining the one or more non-diffs comprises processing the at least a portion of the data annotation pairs for presence of at least one non-diff of a same token type in respective input data annotations and corresponding output data annotations.

16. The computer program product of claim 12, wherein determining the one or more non-diffs comprises processing the at least a portion of the data annotation pairs for presence of one or more repeating characters within at least one non-diff in respective input data annotations and corresponding output data annotations.

17. The computer program product of claim 12, wherein the user feedback comprises at least one of acceptance of at least a portion of the one or more identified data annotation properties and rejection of at least a portion of the one or more identified data annotation properties.

18. The computer program product of claim 12, wherein the program instructions executable by a computing device further cause the computing device to:

compute quality scores for the obtained set of data annotation pairs, wherein the quality scores are based at least in part on extent of multiple intents associated with the obtained set of data annotation pairs.

19. The computer program product of claim 18, wherein the program instructions executable by a computing device further cause the computing device to:

compute quality scores for the final collection of data annotation pairs, wherein the quality scores are based at least in part on extent of multiple intents associated with the final collection of data annotation pairs; and compare the quality scores for the final collection of data annotation pairs to the quality scores for the obtained set of data annotation pairs.

20. A system comprising:

a memory configured to store program instructions; and a processor operatively coupled to the memory to execute the program instructions to:

obtain a set of data annotation pairs, wherein each of the data annotation pairs comprises an input data annotation in a first format and a corresponding output data annotation in a second format;

determine, within at least a portion of the data annotation pairs, one or more non-diffs;

determine, across the at least a portion of the data annotation pairs, one or more data annotation properties associated with multiple intents by processing at least a portion of the one or more non-diffs using one or more regular expression learning-based clustering algorithms to group instances of the one or more non-diffs within the at least a portion of the data annotation pairs on a basis of at least one of (i) one or more repeating characters within the one or more non-diffs, (ii) non-diff positioning, and (iii) one or more matching words within the one or more non-diffs;

modify at least a portion of the data annotation pairs based at least in part on the one or more identified data annotation properties;

output the modified data annotation pairs to at least one user; and generate a final collection of data annotation pairs by processing at least a portion of the modified data annotation pairs and user feedback received in response to the outputting of the modified data annotation pairs.

* * * * *